United States Patent
Kim

(10) Patent No.: US 8,031,298 B2
(45) Date of Patent: Oct. 4, 2011

(54) LIQUID CRYSTAL DISPLAY AND METHOD OF MANUFACTURING THE SAME

(75) Inventor: Dong Gyu Kim, Yongin (KR)

(73) Assignee: Samsung Electronics Co., Ltd. (KR)

( * ) Notice: Subject to any disclaimer, the term of this patent is extended or adjusted under 35 U.S.C. 154(b) by 1118 days.

(21) Appl. No.: 11/776,443

(22) Filed: Jul. 11, 2007

(65) Prior Publication Data

US 2008/0129669 A1    Jun. 5, 2008

(30) Foreign Application Priority Data

Dec. 5, 2006    (KR) .................. 10-2006-0122274

(51) Int. Cl.
    *G02F 1/1335*    (2006.01)

(52) U.S. Cl. ........................................ 349/106; 349/141
(58) Field of Classification Search .................. None
    See application file for complete search history.

(56) References Cited

U.S. PATENT DOCUMENTS

| 2004/0105051 A1* | 6/2004 | Chuang et al. ............... 349/106 |
| 2004/0125277 A1* | 7/2004 | Kim et al. .................... 349/106 |
| 2005/0122442 A1* | 6/2005 | Park .............................. 349/43 |

* cited by examiner

*Primary Examiner* — Hemang Sanghavi
(74) *Attorney, Agent, or Firm* — Innovation Counsel LLP

(57) ABSTRACT

A liquid crystal display (LCD) and a method of manufacturing the same in which the color filter remains in a boundary portion between pixel electrodes on a storage electrode line or the pixel and common electrodes to prevent residuals of the pixel electrode from shorting the pixel electrodes when the color filter is removed.

7 Claims, 9 Drawing Sheets

LIQUID CRYSTAL DISPLAY AND METHOD OF MANUFACTURING THE SAME

REFERENCE TO RELATED APPLICATIONS

This application claims the benefit of Korean Patent Application No. 10-2006-0122274 filed on Dec. 5, 2006 in the Korean Intellectual Property Office the entire contents of which are incorporated herein by reference as if fully set forth herein.

BACKGROUND OF THE INVENTION

1. Field of Invention

The present invention relates to a liquid crystal display and, more particularly, to an LCD to which a color filter on array structure is applied and a method of manufacturing the LCD.

2. Description of the Prior Art

A liquid crystal display (LCD) comprises a lower substrate with thin film transistors (TFTs), pixel electrodes and the like formed thereon, an upper substrate with a common electrode and the like formed thereon, and a liquid crystal layer formed between the lower and upper substrates. When a voltage is applied to pixel and common electrodes of such an LCD, an electric field is generated in the liquid crystal layer due to the potential difference applied between the two electrodes. The alignment of liquid crystal molecules are changed in accordance with the intensity of the electric field. A change in the alignment of the liquid crystal molecules causes the polarization of the light passing through the liquid crystal layer to be changed, which leads to a change in the light transmittance due to a polarizer provided on the outer surface of the substrate.

In a conventional LCD, the lower substrate is formed with TFTs, pixel electrodes and the like, and the upper substrate is formed with color filters, a black matrix, a common electrode and the like. However, since the color filters and TFTs should be formed on different substrates, the manufacturing process of such an LCD is complicated. It has been suggested that a structure known as the COA structure be used which provides the color filter on the same substrate with the TFT array.

In an LCD having a COA structure, the color filters may be formed on top of an organic insulation film formed on the lower substrate Alternatively, the color filters may be formed singly in place of the organic insulation film. Where color filters are singly formed, the color filters should be formed to be about two or more times thicker than the usual photoresist. Since the dielectric constant of the color filters is similar to that of the organic insulation film, the color filters are formed with a thickness of 3.0 μm or so, the same as the organic insulation film would be. Further, contrary to the conventional LCD in which color filters are formed on an upper substrate, when the color filters are formed on the lower substrate, the data lines serve as the black matrix and the respective red, green and blue color filters should be formed to overlap the data lines whose width is designed to be 10 to 15 μm or so, as for a conventional LCD.

Such a COA structure has been applied to S-PVA (Super-Patterned Vertical Alignment) display apparatus. In the S-PVA, each pixel is configured to have two sub-pixels and differential voltages are applied to the respective sub-pixels so as to improve the side gray level rounding or reversal, thereby enhancing side visibility. In the LCD having the S-PVA structure, two transistors and two pixel electrodes are provided in a pixel region for expressing one color. The LCD having the S-PVA structure naturally expresses gray levels using a method of applying different peak voltages to the respective pixel electrodes in order to alleviate the side visibility distortion phenomenon.

In an LCD using COA and S-PVA structures, a color filter is not formed on top of the storage electrode of the lower substrate. Accordingly, only a protection film and a gate insulation film exist in such a region of the storage electrode with which to form the dielectric of the storage capacitor between the pixel and storage electrodes.

The color filters for the LCD using COA and S-PVA structures, are formed to have a thickness of 3 μm or more. However, since the photoresist for patterning pixel electrodes is formed to be thinner than the color filters, the thickness of the photoresist changes rapidly at the boundary between a region in which the color filters are formed and a region in which the color filters are not formed. The photoresist formed in such a step portion may not properly be exposed during the light exposing process and the photoresist may not be completely removed in the photoresist developing process. When the photoresist remains in the step portion of the color filters, the conductive layer for forming the pixel electrodes remains in the subsequent wet etching process of the pixel electrodes. Therefore, there is a problem in that two sub-pixels are shorted to each other due to the conductive layer remaining in the step portion between a region in which color filters are formed and a region in which the color filters are not formed.

SUMMARY OF THE INVENTION

Accordingly to one aspect of the present invention, provides a liquid crystal display capable of preventing a short circuit between sub-pixels. Instead, the color filter remains in the boundary portion between two sub-pixels on top of a storage electrode and thus the conductive layer for forming a pixel electrode does not remain when forming a pixel electrode, thereby preventing a short circuit between the sub-pixels.

According to an aspect of the present invention, there is provided an LCD, comprising a plurality of gate lines formed on a substrate; a storage electrode line formed between the gate lines; a plurality of data lines formed in a direction intersecting the gate lines; a color filter formed in a pixel defined at an intersection region of a gate and data lines; and first and second pixel electrodes formed on top of the color filter and spaced apart from each other, the color filter remaining within a boundary between the first and second pixel electrodes on a storage electrode line and being removed where the first and second pixel electrodes are formed.

The LCD may further comprise at least one cut-away pattern for forming multiple domains in the unit pixel and separating the first and second pixel electrodes from each other.

The LCD may further comprise a gate electrode formed to protrude from the gate line, active and ohmic contact layers formed on top of the gate electrode, a source electrode formed to extend from the data line and to partially overlap with the gate electrode, and a drain electrode formed to partially overlap with the gate electrode and connected to the pixel electrode.

According to another aspect of the present invention, there is provided a method of manufacturing an LCD, comprising the steps of forming a plurality of gate lines on a substrate and simultaneously forming a storage electrode line extending between the gate lines; forming a gate insulation film over the gate lines; forming a plurality of data lines extending to intersect the gate lines; forming a protection film and a color filter on the entire structure; developing the color filter such that a portion of a top of the storage electrode line is exposed;

and forming first and second pixel electrodes on top of the color filter to be spaced apart from each other.

The color filter may remain in a boundary portion between the first and second pixel electrodes on the storage electrode line, and may be removed where the first and second pixel electrodes are formed.

According to a further aspect of the present invention, there is provided an LCD comprising a plurality of gate lines formed on a substrate; a storage electrode line formed to extend between the gate lines; a plurality of data lines formed to intersect the gate lines; a color filter formed in a pixel defined at an intersection of the gate and data lines; a pixel electrode line formed to extend between the gate lines; a common electrode line formed to extend between the gate lines while being spaced apart from the pixel electrode; a plurality of pixel electrodes formed to extend from the pixel electrode line on the pixel; and a plurality of common electrodes formed to extend from the common electrode line on the, wherein the color filter remains under the plurality of pixel and common electrodes and is partially removed on the storage electrode line.

The pixel electrode line may be formed on top of the storage electrode line to be isolated therefrom.

The plurality of pixel and common electrodes may be formed to alternate with each other while being spaced apart from each other.

The pixel electrode line, the plurality of pixel electrodes, the common electrode line and the plurality of common electrodes may be simultaneously formed.

According to a still further aspect of the present invention, there is provided a method of manufacturing an LCD, comprising the steps of forming a plurality of gate lines on a substrate and simultaneously forming a storage electrode line extending between the gate lines; forming a gate insulation film on top of the gate lines and the storage electrode line; forming a plurality of data lines extending to intersect the gate lines; forming a protection film and a color filter on the entire structure; developing the color filter such that a portion of a top of the storage electrode line is exposed; and forming a pixel electrode line, a plurality of pixel electrodes, a common electrode line and a plurality of common electrode on top of the color filter.

The storage electrode line may be formed adjacent to one gate line between the gate lines.

The pixel electrode line may be formed to overlap the storage electrode line.

The common electrode line may be formed adjacent to the gate line which is not adjacent to the storage electrode line.

The plurality of pixel and common electrodes may be formed along a pattern of the data lines.

The plurality of pixel and common electrodes may be arranged to alternate with each other while being spaced apart from each other in a predetermined interval in a unit pixel defined at an intersection region of the gate and data lines.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE PREFERRED EMBODIMENT

Figure 1:
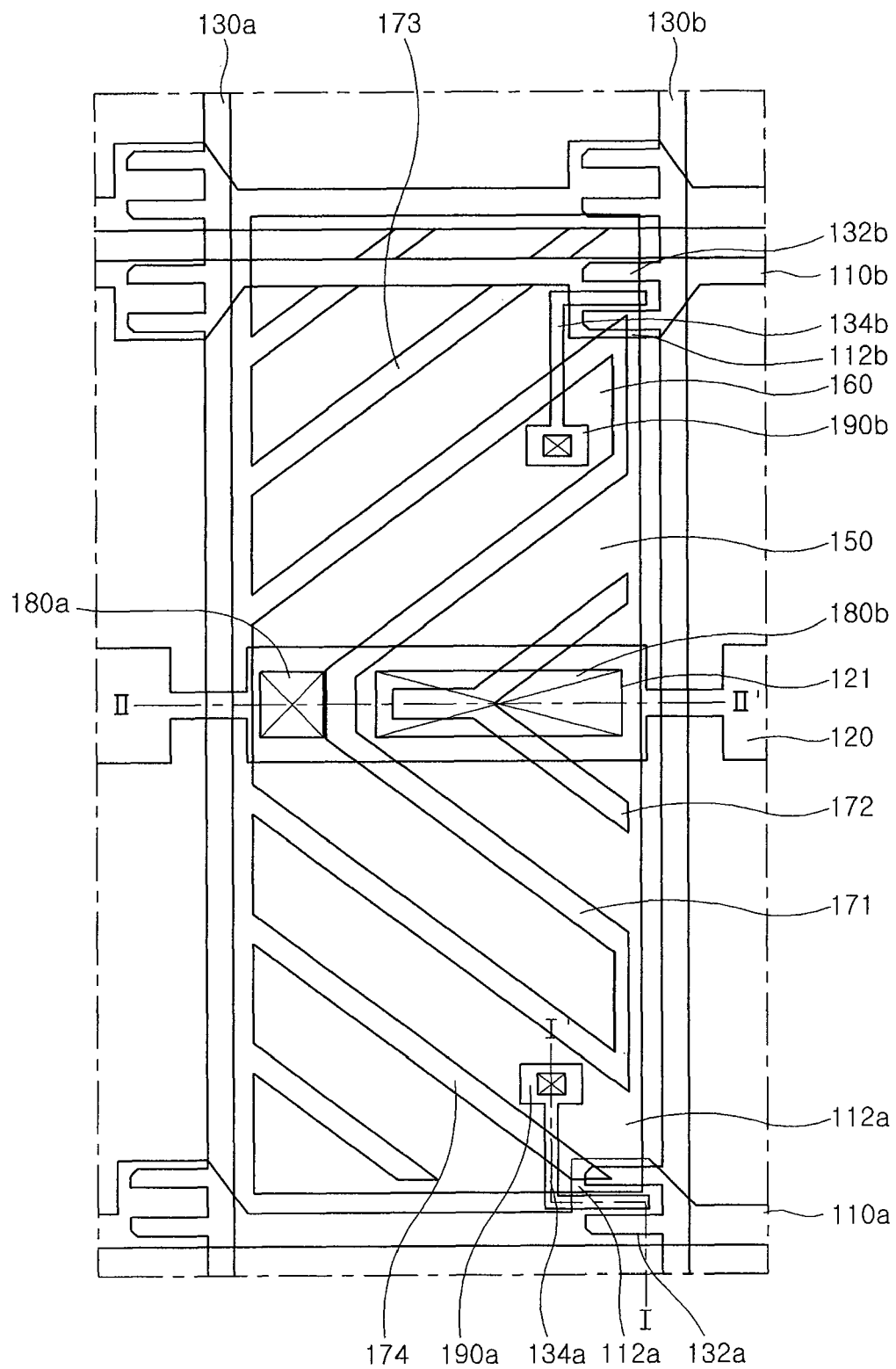
FIG. 1 is a plan view of a lower substrate of a liquid crystal display (LCD) according to an embodiment of the present invention.
Figure 2:
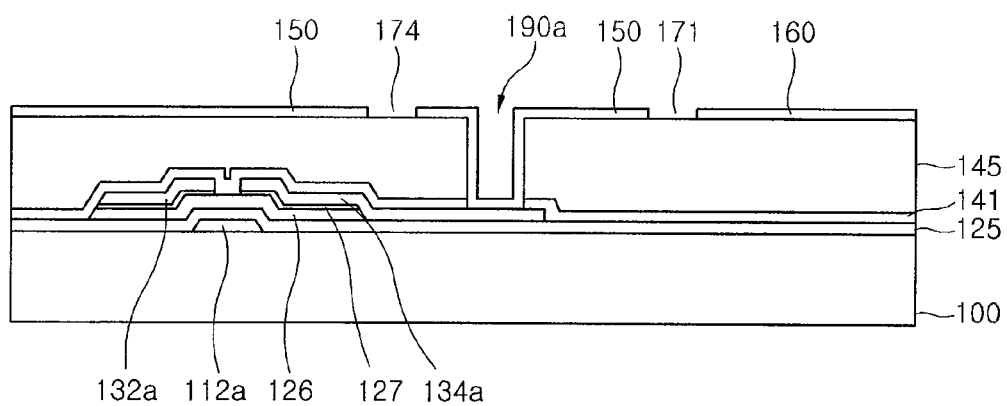
FIG. 2 is a sectional view of the lower substrate taken along line I-I' in FIG. 1.
Figure 3:
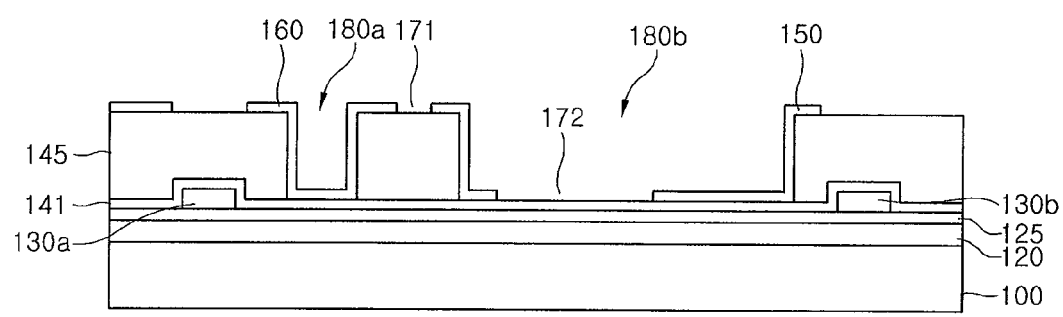
FIG. 3 is a sectional view of the lower substrate taken along line II-II' in FIG. 1.

FIG. 1 is a plan view of a lower substrate of a liquid crystal display (LCD) to which COA and S-PVA structures are applied according to an embodiment of the present invention, FIG. 2 is a sectional view of the lower substrate taken along line I-I' in FIG. 1, and FIG. 3 is a sectional view of the lower substrate taken along line II-II' in FIG. 1.

Referring to FIGS. 1 to 3, the lower substrate comprises first and second gate lines 110a and 110b, a storage electrode line 120, first and second data lines 130a and 130b, first and second pixel electrodes 150 and 160, a plurality of cut-away patterns 171, 172, 173 and 174, and a plurality of contact holes 180a, 180b 190a and 190b.

The lower substrate comprises the first gate line 110a extending in an abscissa direction, the second gate line 110b formed in parallel with the first gate line 110a and spaced apart therefrom at a predetermined interval, a storage electrode line 120 positioned between the first and second gate lines 110a and 110b and including a storage electrode 121, the first and second data lines 130a and 130b formed to extend in an ordinate direction such that they intersect the first and second gate lines 110a and 110b while being insulated therefrom, and a pixel formed at an intersection region of the first and second lines 110a and 110b and the first and second data lines 130a and 130b. Further, a gate pad (not shown) is formed at one end of each of the gate lines 110a and 110b, and a data pad (not shown) is formed at one end of each of the data lines 130a and 130b.

Such a unit pixel comprises first and second sub-pixels and the cut-away pattern 171. The first sub-pixel has a first TFT and the first pixel electrode 150, and the second sub-pixel has a second TFT and the second pixel electrode 160. The cut-away pattern 171 serves to separate the first and second sub-pixels and divide the unit pixel into multiple domains.

The first TFT comprises a first gate electrode 112a connected to the first gate line 110a, a first source electrode 132a connected to the second data line 130b, and a first drain electrode 134a connected to the first pixel electrode 150 through a third contact hole 190a. The first TFT further comprises a gate insulation film 125 and an active layer 126 sequentially formed between the first gate electrode 112a and the first source and drain electrodes 132a and 134a, and an ohmic contact layer 127 formed on at least a portion of the active layer 126. The ohmic contact layer 127 may be formed on the active layer 126 except a channel portion. The first TFT allows a pixel signal, which is supplied to the second data line 130b, to be charged to the first pixel electrode 150 in response to a signal supplied to the first gate line 110a.

In addition, the second TFT comprises a second gate electrode 112b connected to the second gate line 110b, a second source electrode 132b connected to the second data line 130b, and a second drain electrode 134b connected to the second pixel electrode 160 through a fourth contact hole 190b. The first TFT further comprises the gate insulation film 125 and the active layer 126 sequentially formed between the second gate electrode 112b and the second source and drain electrodes 132b and 134b, and the ohmic contact layer 127 formed on at least a portion of the active layer 126. The ohmic contact layer 127 may be formed on the active layer 126 except a channel portion. The second TFT allows a pixel signal, which is supplied to the second data line 130b, to be charged to the second pixel electrode 160 in response to a signal supplied to the second gate line 110b.

As such, the two independent TFTs (i.e., the first and second TFTs) are formed in the first and second sub-pixels, respectively, and different data voltages are charged into the respective sub-pixels after time-dividing a liquid crystal voltage continuously applied to the data lines, i.e., a pixel signal. Accordingly, if two gamma curves are expressed, visibility is greatly enhanced due to the mutual supplementation of the different gamma curves.

The first and second pixel electrodes 150 and 160 are divided from each other by the cut-away pattern 171. The second pixel electrode 160 is formed in a "V" shape extending from left side to right side of its central portion. In addition, the first pixel electrode 150 is formed in a shape surrounding the V-shaped second pixel electrode 160. The first pixel electrode 150 has a plurality of cut-away patterns 172, 173 and 174 as a domain regulating means for controlling the orientation of liquid crystals. The first cut-away pattern 172 is formed in a "Y" shape within the first pixel electrode 150 which the storage electrode line 120 passes. The second cut-away pattern 173 extends downward from a right side edge of an upper portion of the first electrode 150, and the third cut-away pattern 174 extends upward from a right side edge of a lower portion of the first pixel electrode 150. It is preferred that the second and third cut-away patterns 173 and 174 make a right angle therebetween. It is also preferred that the cut-away pattern 171 for dividing the first and second pixel electrodes 150 and 160 from each other make a right angle therebetween, however, the present embodiment is not limited thereto. That is, projection patterns rather than the cut-away patterns may be formed as the domain regulating means for controlling the orientation of liquid crystals.

A protection film 141 is formed on top of the first and second gate lines 110a and 110b, the first and second data lines 130a and 130b, and the first and second TFTs. The protection film 141 is formed using a low-dielectric organic insulation film.

A color filter 145 is formed on the protection film 141 of the unit pixel. Red, green and blue filters are repeatedly formed in each of the pixels. The color filter 145 serves to give a color to the light emitted from a light source and passing through a liquid crystal layer (not shown). The color filter 145 may be formed of a photosensitive organic material.

The first and second contact holes 180a and 180b are formed by allowing the color filter 145 on the storage electrode 121 to be removed when developing the color filter 145. That is, the first and second contact holes 180a and 180b are formed by causing the color filter 145 to remain in a boundary portion between the first and second pixel electrodes 150 and 160 and causing the color filter 145 to be removed in a portion in which the first and second pixel electrodes 150 and 160 are formed. As such, the color filter 145 remains in the boundary portion between the first and second pixel electrodes 150 and 160. Accordingly no residuals of the pixel electrodes remain in the boundary portion, thereby preventing a short circuit between the two electrodes. The first and second pixel electrodes 150 and 160 formed through the first and second contact holes 180a and 180b and the storage electrode 121 form a storage capacitor with the gate insulation and protection films 125 and 141 interposed therebetween.

The third and fourth contact holes 190a and 190b are formed by etching predetermined regions of the color filter 145 and the protection film 141 such that the first and second drain electrodes 134a and 134b are exposed.

FIGS. 4A to 4D are sectional views of the lower substrate taken along line I-I' in FIG. 1, sequentially illustrating a method of manufacturing the lower substrate of the LCD according to the embodiment of the present invention, and FIGS. 5A to 5D are sectional views of the lower substrate taken along line II-II' in FIG. 1, sequentially illustrating the method of manufacturing the lower substrate of the LCD according to the embodiment of the present invention.

Figure 4A:
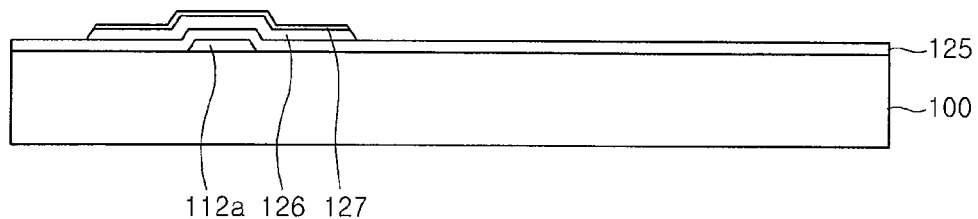
FIGS. 4A to 4D are sectional views of the lower substrate taken along line I-I' in FIG. 1, sequentially illustrating a method of manufacturing the lower substrate of the LCD according to the embodiment of the present invention.
Figure 5A:
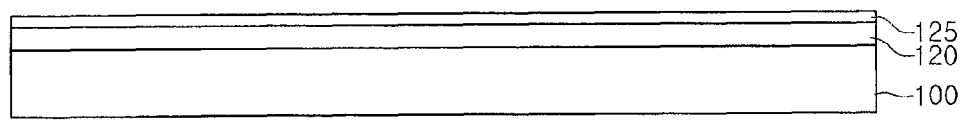
FIGS. 5A to 5D are sectional views of the lower substrate taken along line II-II' in FIG. 1, sequentially illustrating the method of manufacturing the lower substrate of the LCD according to the embodiment of the present invention.

Referring to FIGS. 4A and 5A, a first conductive layer is formed on top of the substrate 100 and then patterned through a photo and etching process using a first mask. Accordingly, there are formed a plurality of the gate lines 110a and 110b extending in the abscissa direction at a predetermined interval and a plurality of the gate electrodes 112a and 112b partially protruding from the plurality of gate lines 110a and 110b. In addition, at the same time, the storage electrode line 120 including the storage electrode 121 is formed between the gate lines 110a and 110b. It is preferred that the first conductive layer be formed of at least any one of Al, Nd, Ag, Cr, Ti, Ta and Mo, or an alloy thereof. Further, the first conductive layer may be formed in not only a single-layered structure but also a multiple-layered structure including a plurality of metal layers. That is, the conductive layer may be formed in a double-layered structure including a metal layer with a superior physicochemical property, such as Cr, Ti, Ta or Mo, and Al or Ag based metal layer with small specific resistance. Further, the gate insulation film 125 is formed on top of the entire structure. The gate insulation film 125 is formed using an inorganic insulation film comprising a silicon oxide or silicon nitride film. For example, a hydrogenated amorphous silicone film and a doped amorphous silicone film are sequentially formed on top of the entire structure. In order to overlap the gate electrodes 112a and 112b, the active and ohmic contact layers 126 and 127 are formed by patterning the hydrogenated amorphous silicone film and the doped amorphous silicone film through a photo and etching process using a second mask.

Figure 4B:
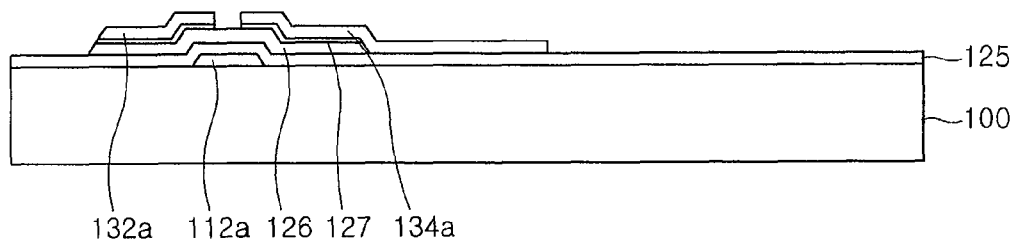
Figure 5B:
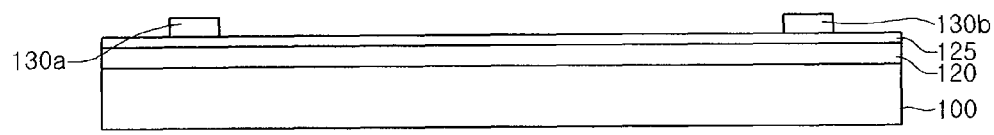

Referring to FIGS. 4B and 5B, a second conductive layer is formed on top of the entire structure and then patterned through a photo and etching process using a third mask. Accordingly, a plurality of the data lines 130a and 130b extending to intersect the gate lines 110a and 110b are formed to be spaced apart from each other at a predetermined interval. At the same time, the source electrodes 132a and 132b and the drain electrodes 134a and 134b, which partially overlap the gate electrodes 112a and 112b, respectively, are formed to be spaced apart from each other at a predetermined interval. At this time, the source electrodes 132a and 132b are formed to protrude from the data lines 130a and 130b, respectively, and a portion of the active layer 126 exposed by the source electrodes 132a and 132b and the drain electrodes 134a and 134b become a channel region. It is preferred that a metal single- or multiple-layered structure be used in the second conductive layer. The second conductive layer may be formed of the same material as the first conductive layer for forming the gate lines 110a and 110b, and may be formed in a multiple-layered structure.

Figure 4C:
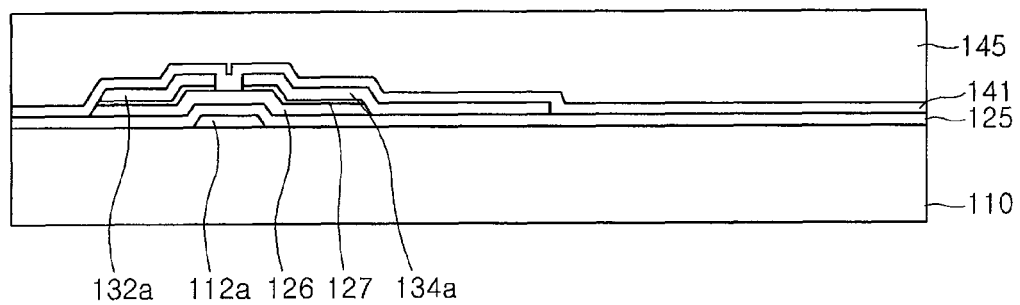
Figure 5C:
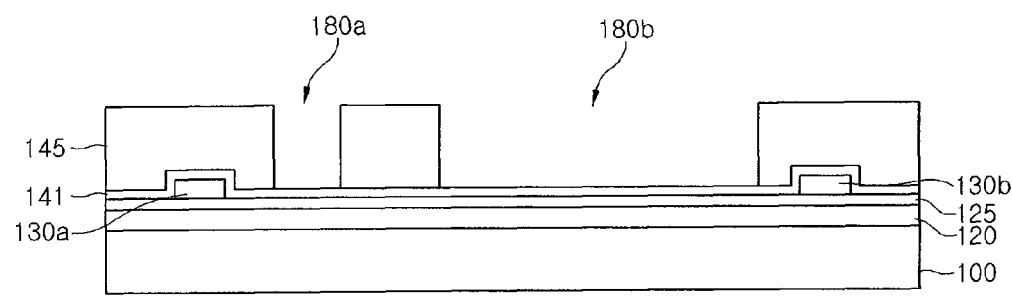

Referring to FIGS. 4C and 5C, as the protection film 141, a silicon nitride film (SiNx) is formed on the entire structure. After a photosensitive organic material is applied on the protection film 141, the color filter 145 is formed through an exposing and developing process using a fourth mask such that the unit pixel remains. The color filter 145 on the storage electrode 121 is partially removed when developing the color filter 145, so that the first and second contact holes 180a and 180b are formed by allowing a portion of the color filter 145 to remain in a boundary portion between the first and second pixel electrodes 150 and 160 and by allowing the lower protection film 141 to be exposed in a region in which the first and second pixel electrodes 150 and 160 are formed. Since the first pixel electrode 150 is formed to have a predetermined bent shape on the storage electrode 121, the color filter 145 preferably remains along the bent shape of the first pixel electrode 150 in the boundary portion between the first and second pixel electrodes 150 and 160. However, since the process margin can be reduced, the color filter 145 can be caused to remain so as to partially overlap the first pixel electrode 150 to the extent that the capacitance of the storage capacitor is not greatly reduced.

Figure 4D:
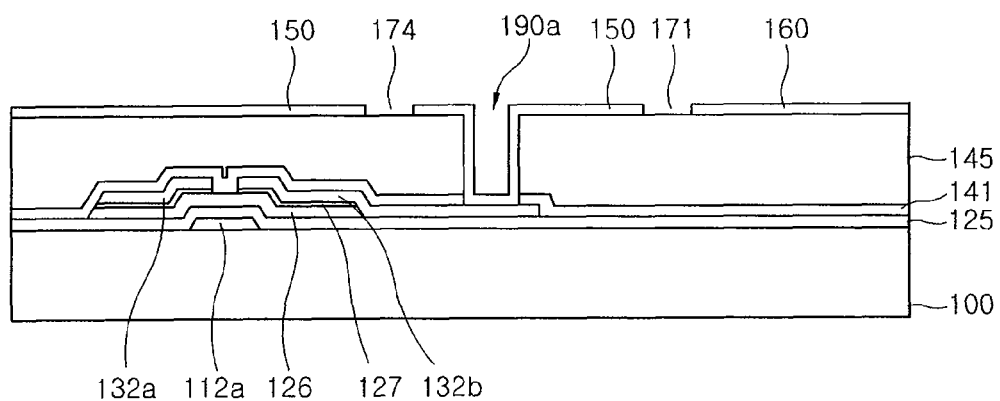
Figure 5D:
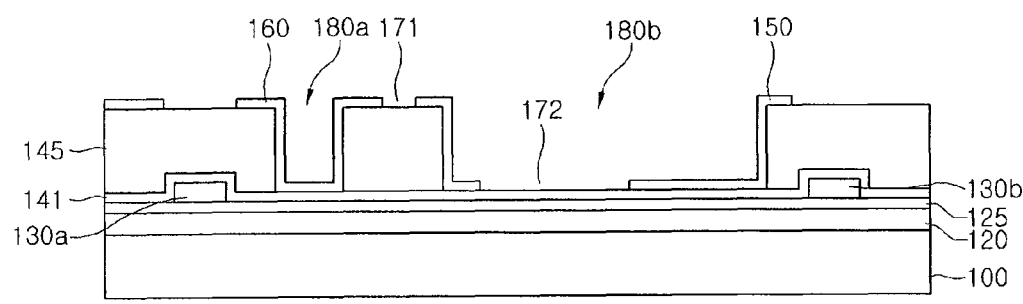

Referring to FIGS. 4D and 5D, predetermined regions of the color filter 145 and the protection film 141 are removed through a photo and etching process using a fifth mask to form the third and fourth contact holes 190a and 190b respectively exposing the drain electrodes 134a and 134b. A third conductive layer is formed on the entire structure and then etched through a photo and etching process using a sixth mask to form the first and second pixel electrodes 150 and 160 and the cut-away patterns 171, 172 and 173. It is preferred that a transparent conductive layer including indium tin oxide (ITO) or indium zinc oxide (IZO) be used to form the third conductive layer.

The aforementioned configuration, in which a color filter remains in a boundary portion between first and second pixel electrodes on a storage electrode, can also be applied to an LCD having an S-IPS (In Plane Switching) structure in which common and pixel electrodes are formed on the same substrate, which will be described below.

Figure 6:
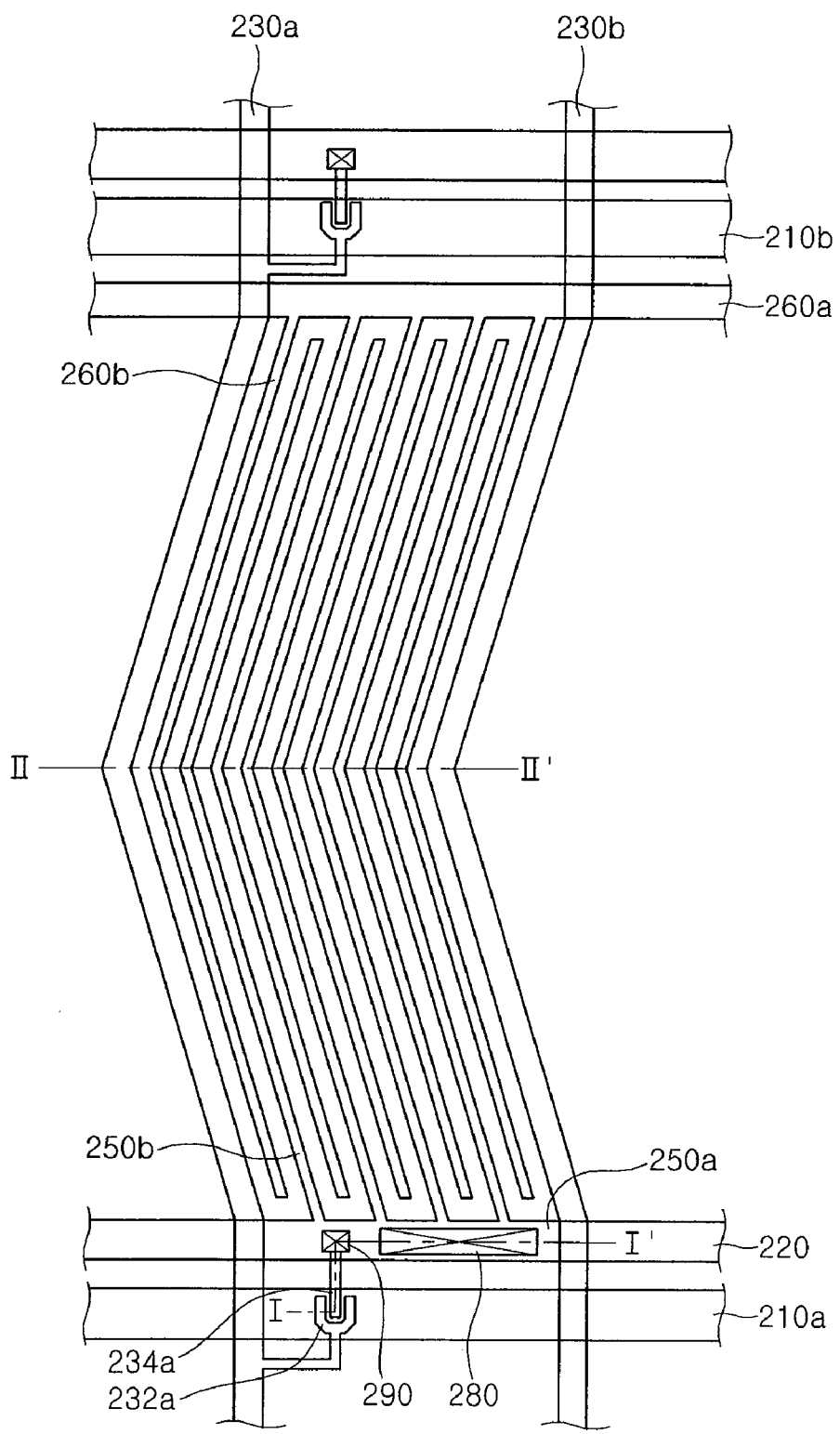
FIG. 6 is a plan view of a lower substrate of an LCD according to another embodiment of the present invention.
Figure 7:
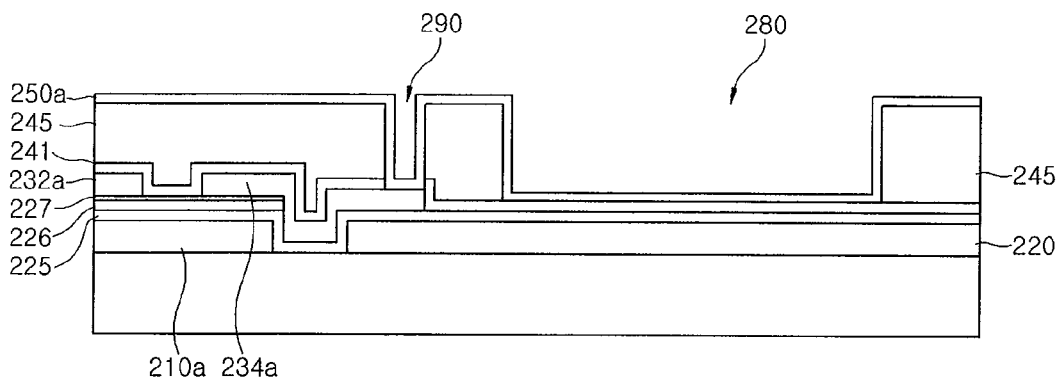
FIG. 7 is a sectional view of the lower substrate taken along line I-I' in FIG. 6.
Figure 8:
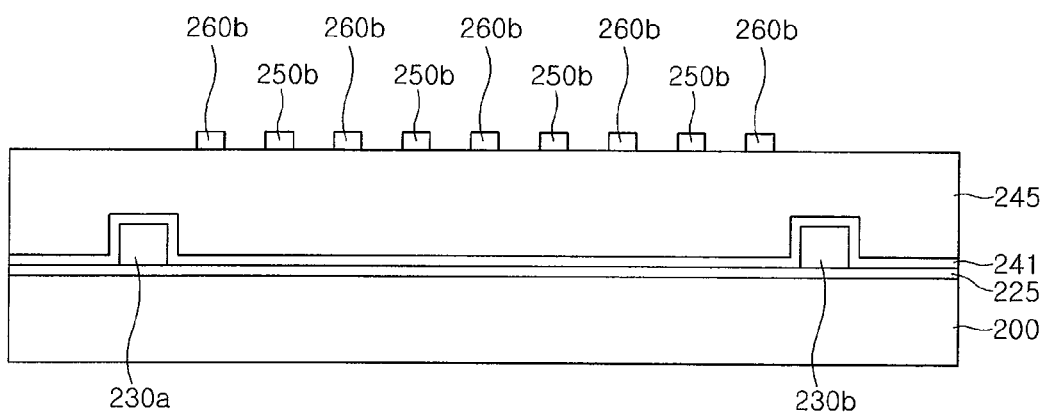
FIG. 8 is a sectional view of the lower substrate taken along line II-II' in FIG. 6.

FIG. 6 is a plan view of a lower substrate of an LCD to which COA and S-IPS structures are applied according to another embodiment of the present invention, FIG. 7 is a sectional view of the lower substrate taken along line I-I' in FIG. 6, and FIG. 8 is a sectional view of the lower substrate taken along line II-II' in FIG. 6.

Referring to FIGS. 6 to 8, the lower substrate comprises first and second gate lines 210a and 210b, a storage electrode line 220, first and second data lines 230a and 230b, a pixel electrode line 250a, pixel electrodes 250b, a common electrode line 260a, common electrodes 260b, and first and second contact holes 280 and 290.

The lower substrate comprises the first gate line 210a formed to extend in an abscissa direction, the second gate line 210b formed in parallel with the first gate line 210a to be spaced apart therefrom at a predetermined interval, the storage electrode line 220 formed between the first and second gate lines 210a and 210b to be adjacent to a side of the first gate line 210a, the first and second data lines 230a and 230b formed to extend in an ordinate direction such that they intersect the first and second gate lines 210a and 210b while being insulated therefrom, and a pixel formed at an intersection region of the first and second lines 210a and 210b and the first and second data lines 230a and 230b. Further, a gate pad (not shown) is formed at one end of each of the gate lines 210a and 210b, and a data pad (not shown) is formed at one end of each of the data lines 230a and 230b.

In addition, the pixel electrode line 250a is formed to be isolated from the storage electrode line 220 and to overlap therewith. That is, the pixel electrode line 250a is formed on top of the storage electrode line 220 in the same shape as the storage electrode line 220. Further, the common electrode line 260 is formed adjacent to the second gate line 210b between the first and second gate lines 210a and 210b. A plurality of the pixel electrodes 250b are formed to extend along the first and second data lines 230a and 230b from the pixel electrode line 250a, and a plurality of the common electrodes 260b are formed to extend along the first and second 230a and 230b from the common electrode line 260a. The pixel electrodes 250b extend while being spaced apart from the common electrode line 260a at a predetermined interval, and the common electrodes 260b extend while being spaced apart from the pixel electrode line 250a at a predetermined interval. Further, the pixel and common electrodes 250b and 260b are alternately arranged such that the pixel electrodes 250b are positioned between the common electrodes 260b and the common electrodes 260b are positioned between the pixel electrodes 250b. Furthermore, the pixel electrode line 250a, the pixel electrodes 250b, the common electrode line 260a and the common electrodes 260b are formed on the same plane through the same process.

In addition, a gate insulation film 225 is formed on the entire structure including the first and second gate lines 210a and 210b. A source electrode 232a extending from the second data line 230a to be formed on the first gate line 210a and a drain electrode 234a formed to be spaced apart therefrom at a predetermined interval constitute a TFT together with an active layer 226 and an ohmic contact layer 227 formed thereunder. The drain electrode 234a may be connected to the pixel electrode line 250a through the second contact hole 290, and the ohmic contact layer 227 may be formed on the active layer 226 except a channel portion. The TFT allows a pixel signal, which is supplied to the first data line 230a, to be charged to the pixel electrode line 250a in response to a signal supplied to the first gate line 210a.

A protection film 241 is formed on top of the first and second gate lines 210a and 210b, the first and second data lines 230a and 230b, and the TFT. The protection film 241 is formed using a low-dielectric organic insulation film.

A color filter 245 is formed on the protection film 241 of the unit pixel. Red, green and blue filters are repeatedly formed in unit pixels, respectively. The color filter 245 serves to give a color to the light emitted from a light source and passing through a liquid crystal layer (not shown). The color filter 245 may be formed of a photosensitive organic substance.

The first contact hole 280 is formed by removing the color filter 245 on the storage electrode line 220 when developing the color filter 245. The pixel electrode line 250a formed through the first contact hole 280 constitutes a storage capacitor together with the storage electrode line 220 while the pixel electrode line 250a are interposed between the gate insulation film 225 and the protection film 241.

The second contact hole 290 is formed by etching a predetermined region of the color filter 245 and the protection film 241 such that the drain electrode 243a is exposed. The pixel electrode line 250a is connected to the drain electrode 234a through the second contact hole 290.

FIGS. 9A to 9D are sectional views of the lower substrate taken along line I-I' in FIG. 1, sequentially illustrating a method of manufacturing the lower substrate of the LCD according to the other embodiment of the present invention, and FIGS. 10A to 10D are sectional views of the lower substrate taken along line II-II' in FIG. 1, sequentially illustrating a method of manufacturing the lower substrate of the LCD according to the other embodiment of the present invention.

Figure 9A:
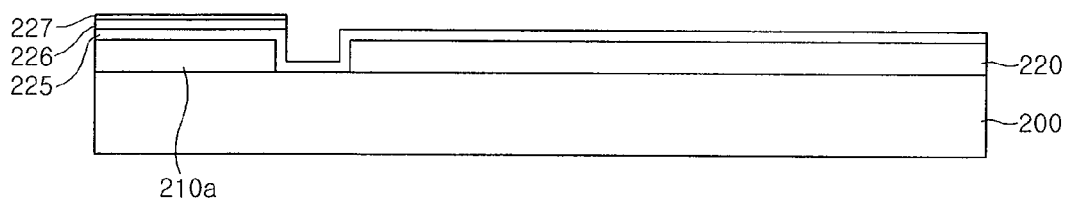
FIGS. 9A to 9D are sectional views of the lower substrate taken along line I-I' in FIG. 1, sequentially illustrating a method of manufacturing the lower substrate of the LCD according to the other embodiment of the present invention.
Figure 10A:
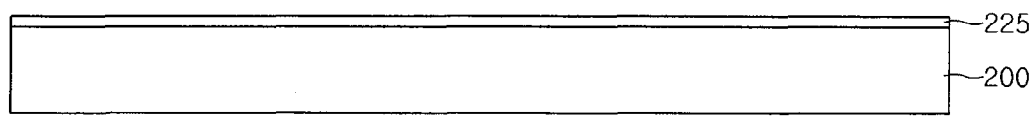
FIGS. 10A to 10D are sectional views of the lower substrate taken along line II-II' in FIG. 1, sequentially illustrating the method of manufacturing the lower substrate of the LCD according to the other embodiment of the present invention.

Referring to FIGS. 9A and 10A, a first conductive layer is formed on top of the substrate 200 and then patterned through a photo and etching process using a first mask. Accordingly, there are formed a plurality of the gate lines 210a and 210b extending in the abscissa direction at a predetermined interval. At the same time, the storage electrode line 220 is also formed between the gate lines 210a and 210b, wherein the storage electrode line 220 is formed adjacent to the gate line 210a. Here, it is preferred that the first conductive layer be formed of at least any one of Al, Nd, Ag, Cr, Ti, Ta and Mo, or an alloy thereof. Further, the first conductive layer may be formed in not only a single-layered structure but also a multiple-layer structure including a plurality of metal layers. That is, the conductive layer may be formed in a double-layered structure including a metal layer with a superior physicochemical property, such as Cr, Ti, Ta or Mo, and Al or Ag based metal layer with small specific resistance. Further, the gate insulation film 225 is formed on top of the entire structure. Here, the gate insulation film 225 is formed using an inorganic insulation film comprising a silicon oxide or silicon nitride film. For example, a hydrogenated amorphous silicone film and a doped amorphous silicone film are sequentially formed on top of the entire structure. In order to overlap a predetermined region on the gate lines 210a and 210b, the active and ohmic contact layers 226 and 227 are formed by patterning the hydrogenated amorphous silicone film and the doped amorphous silicone film through a photo and etching process using a second mask.

Figure 9B:
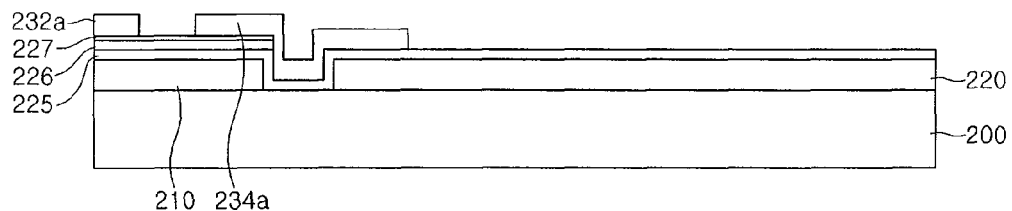
Figure 10B:
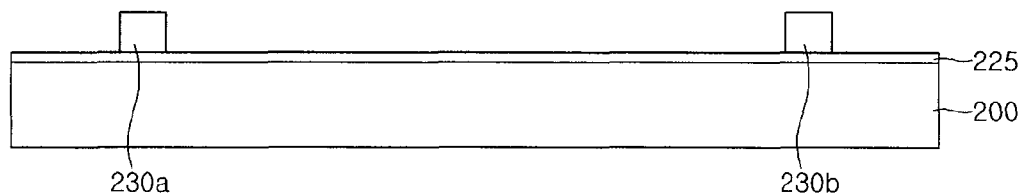

Referring to FIGS. 9B and 10B, a second conductive layer is formed on top of the entire structure and then patterned through a photo and etching process using a third mask. Accordingly, a plurality of the data lines 230a and 230b extending to intersect the gate lines 210a and 210b are formed to be spaced apart from each other at a predetermined interval. At the same time, the source electrode 232a and the drain electrode 234a, which partially overlap on the gate line 210a, are formed to be spaced apart from each other at a predetermined interval. The source electrode 232a is formed to protrude from the data line 230a, and a portion of the active layer 226 exposed by the source electrode 232a and the drain electrode 234a become a channel region. It is preferred that a metal single- or multiple-layered structure be used in the second conductive layer. The second conductive layer may be formed of the same material as the first conductive layer for forming the gate lines 210a and 210b, and may be formed in a multiple-layered structure.

Figure 9C:
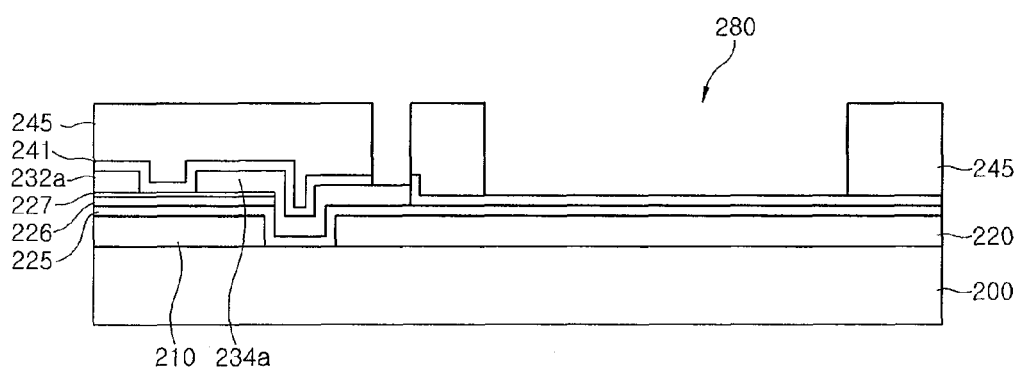
Figure 10C:
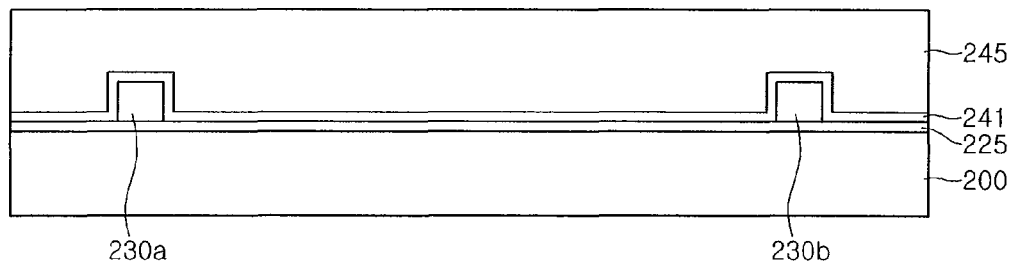

Referring to FIGS. 9C and 10C, as the protection film 241, a silicon nitride film (SiNx) is formed on the entire structure. After a photosensitive organic material is applied on the protection film 241, the color filter 245 is formed through an exposing and developing process using a fourth mask such that the unit pixel remains. The first contact hole 280 is formed by allowing the color filter 245 on the storage electrode line 220 to be partially removed when developing the color filter 245. The first contact hole 280 is to allow the storage electrode line 220 and the pixel electrode line 250a, which will be formed later, to form the storage capacitor. Since the capacitance of the storage capacitor can be increased as the area of the first contact hole 280 is large, it is preferred that the first contact hole 280 be formed as large as possible. However, since the second contact hole 290, which will be formed later, is also formed on the same line as the first contact hole 280, it is preferable that the first contact hole 280 be formed as large as possible to the extent that the second contact hole 290 is not influenced when it is formed.

Figure 9D:
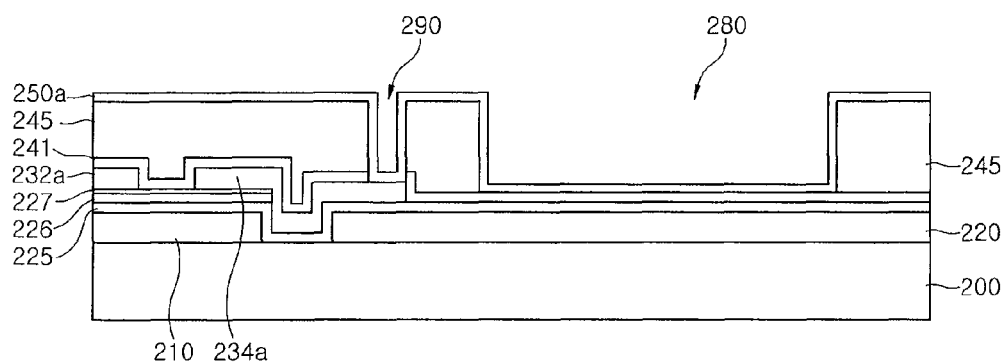
Figure 10D:
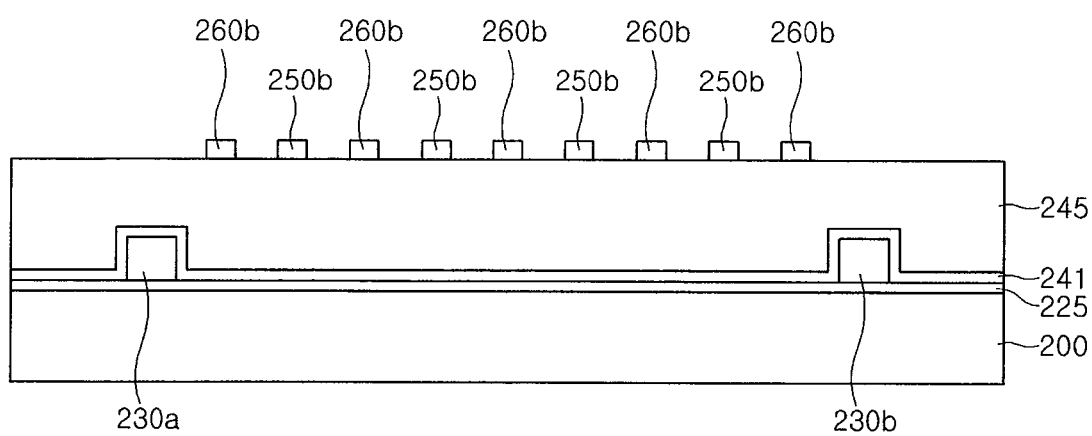

Referring to FIGS. 9D and 10D, predetermined regions of the color filter 245 and the protection film 241 are removed through a photo and etching process using a fifth mask to form the second contact hole 290 exposing the drain electrode 234a. A third conductive layer is formed on the entire structure and then etched through a photo and etching process using a sixth mask so as to form the pixel electrode line 250a, the plurality of pixel electrodes 250b, the common electrode line 260a and the plurality of common electrodes 260b. The pixel electrode line 250a is formed in the same pattern as the storage electrode line 220 so as to overlap therewith, and the common electrode line 260a is formed adjacent to the second gate line 210b between the first and second gate lines 210a and 210b. Further, the plurality of pixel electrodes 250b are formed to extend along the first and second data lines 230a and 230b from the pixel electrode line 250a, and the plurality of common electrodes 260b are formed to extend along the first and second data lines 230a and 230b from the common electrode line 260a. The plurality of pixel electrodes 250b extend to be spaced apart from the common electrode line 260a at a predetermined interval, and the plurality of common electrodes 260b extend to be spaced apart from the pixel electrode line 250a at a predetermined interval. Further, the pixel electrodes 250b and the common electrodes 260b are alternately aligned such that the pixel electrodes 250b are positioned between the common electrodes 260b and the common electrodes 260b are positioned between the pixel electrodes 250b. It is preferred that a transparent conductive layer including indium tin oxide (ITO) or indium zinc oxide (IZO) be used as the third conductive layer.

According to the present invention described above, a color filter is not removed but remains between pixel electrodes on a storage electrode line or the pixel and common electrodes in an LCD using a COA structure, whereby a short circuit can be prevented from occurring due to residuals of the pixel electrode in a step portion of the color filter produced by removing the color filter between the pixel electrodes or the pixel and common electrodes.

The scope of the present invention is not limited to the embodiment described and illustrated above but is defined by the appended claims. It will be apparent that those skilled in the art can make various modifications and changes thereto within the scope of the invention defined by the claims. Therefore, the true scope of the present invention should be defined by the technical spirit of the appended claims.

What is claimed is:
1. A liquid crystal display (LCD), comprising:
a plurality of gate lines formed on a substrate;
a storage electrode line formed between the gate lines;
a plurality of data lines formed to extend in a direction intersecting the gate lines;
a color filter formed at an intersection region of the gate and data lines; and
first and second pixel electrodes formed on top of the color filter and spaced apart from each other at a predetermined interval, the color filter remaining in a boundary portion between the first and second pixel electrodes on the storage electrode line, and being removed where the first and second pixel electrodes are formed.

2. The LCD as claimed in claim 1, further comprising at least one cut-away pattern for forming multiple domains in the unit pixel and separating the first and second pixel electrodes from each other.

3. The LCD as claimed in claim 1, further comprising a gate electrode formed to protrude from the gate line, active and ohmic contact layers formed on top of the gate electrode, a source electrode formed to extend from the data line and to partially overlap with the gate electrode, and a drain electrode formed to partially overlap the gate electrode and connected to the pixel electrode.

4. An LCD comprising:
a plurality of gate lines formed on a substrate;
a storage electrode line separated from the gate lines and formed to extend between the gate lines;
a plurality of data lines formed to extend in a direction intersecting the gate lines;
a color filter formed in a unit pixel defined at an intersection region of the gate and data lines;
a pixel electrode line electrically isolated from the storage electrode line and formed to extend between the gate lines;
a common electrode line formed to extend between the gate lines while being spaced apart from the pixel electrode line at a predetermined interval;
a plurality of pixel electrodes formed to extend from the pixel electrode line on the unit pixel; and
a plurality of common electrodes formed to extend from the common electrode line on the unit pixel,
wherein the color filter remains under the plurality of pixel electrodes and common electrodes and is partially removed on the storage electrode line.

5. The LCD as claimed in claim 4, wherein the pixel electrode line is formed on top of the storage electrode line to be isolated therefrom.

6. The LCD as claimed in claim 4, wherein the plurality of pixel and common electrodes are formed to alternate with each other while being spaced apart from each other in a predetermined interval.

7. The LCD as claimed in claim 4, wherein the pixel electrode line, the plurality of pixel electrodes, the common electrode line and the plurality of common electrodes are simultaneously formed.

* * * * *